United States Patent [19]

Kar

[11] Patent Number: 6,012,082

[45] Date of Patent: *Jan. 4, 2000

[54] CPU-CYCLE STEALING FOR MULTI-TASKING OPERATING SYSTEM

[75] Inventor: Rabindra P. Kar, Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,742

[22] Filed: Sep. 23, 1997

Related U.S. Application Data

[63] Continuation of application No. 08/354,474, Dec. 12, 1994, abandoned.

[51] Int. Cl.[7] .................................................... G06F 9/00
[52] U.S. Cl. ............................................. 709/107; 709/102
[58] Field of Search ..................................... 395/650, 677; 375/682; 709/100, 102, 107

[56] References Cited

U.S. PATENT DOCUMENTS

| | | | |
|---|---|---|---|
| 5,339,426 | 8/1994 | Aoshima | 395/700 |
| 5,390,332 | 2/1995 | Golson | 395/725 |
| 5,481,684 | 1/1996 | Richter et al. | 395/375 |

OTHER PUBLICATIONS

"Intercepting API Functions in Win32", Peitrek, Matt, P.C. Magazine, Nov. 8, 1994.

"Hook and Monitor and 16–Bit Windows Function with our ProcHook DLL", Finnegan, James, Microsoft Systems Journal, Jan. 1994.

Kyle Marsh, Win32 Hooks, Feb. 1994, Microsoft Developer Network Technology Group.

*Primary Examiner*—Majid A. Banankhah
*Attorney, Agent, or Firm*—Blakely, Sokoloff, Taylor & Zafman LLP

[57] ABSTRACT

A method and apparatus for CPU cycle stealing on a non-preemptive multi-tasking operating system allowing a first application to preempt other applications which are running concurrently on the operating system. The steps taken to perform the CPU cycle stealing include: inserting a hook near a starting address of message monitoring calls, and vectoring the execution path to the first application whenever one of the other applications calls the message monitoring calls, allowing the first application to steal CPU cycles from one of the other applications. The vectoring is provided by the hook inserted near the starting address of the message monitoring calls.

20 Claims, 6 Drawing Sheets

CPU-CYCLE STEALING FOR MULTI-TASKING OPERATING SYSTEM

This is a Rule 1.62 Continuation of application Ser. No. 08/354,474, filed Dec. 12, 1994, now abandoned.

BACKGROUND OF THE INVENTION

(1) Field of the Invention

The invention relates to multi-tasking operating systems, more particularly, to methods and apparatus for CPU cycle stealing on a non-preemptive multi-tasking operating system.

(2) Prior Art

With a non-preemptive, multi-tasking operating system, several applications share access to the computer's central processing unit (CPU). An operating system is multi-tasking if it allows more than one program/application to run at the same time at the user's discretion. In particular, Microsoft Windows® operating system is a cooperative non-preemptive operating system.

In a preemptive operating system, the operating system keeps track of how much time each application gets by distributing the CPU time allocated to each application that is running. In contrast, in a cooperative non-preemptive operating system, the operating system does not keep track of time spent by each application running in a multi-tasking environment. Typically, the operating system performs the scheduling of applications in a simple round robin type scheme. Consequently, a cooperative non-preemptive operating system may not allow the most efficient distribution of CPU time for applications requiring a certain amount of CPU cycles, such as those executing in real time.

Existing methods allowing an application running on a non-preemptive multi-tasking operating system to steal CPU cycle time include the use of an interrupt handler. A computer system typically has a timer chip which transmits an electrical signal at predetermined periods. A timer interrupt handler incorporating the timer chip allows some cycle stealing per predetermined time period. A disadvantage of using a hardware interrupt handler is that when a program runs in the interrupt context, significant restrictions are imposed on what the program can do, which must be satisfied or the whole system may be corrupted. For example, many O.S. API (operating system application programming interface) calls are not allowed.

Existing methods of sharing the CPU clock cycles on a non-preemptive multi-tasking O.S., including the interrupt handler method and the round robin scheme of sharing CPU time, are not only extremely inefficient and inconvenient for an operating system running multiple applications on a single PC, but vastly affects the perceived quality of transmission of data between more than one PC, one or more at a local station and one or more at a remote station all sharing the same application.

For example, a computer running applications one, two, and three, running on a non-preemptive multi-tasking operating system such as Microsoft Windows®, may transmit data over a network to a second computer, computer two, also running application one, along with other applications on a non-preemptive multi-tasking operating system such as Microsoft Windows®. Application one on computer one communicating with application one on computer two would not be able to maintain a smooth, quick flow of data when the other applications running on computer one and computer two are scheduled to run on either the round robin scheme or are initiated by a timer interrupt handler. Further, application one on computer one and computer two would have to wait for its turn to run and only then could application one send and/or receive data.

Thus, without the basic ability for an application to steal CPU cycle time from other concurrently running applications, a non-preemptive multi-tasking operating system, may not produce desired results, especially with natural data types such as audio and video data which may not be sent and received in a user-perceived timely manner.

As one of the backbones and foundations of impending and now popular technology involving communication between multiple computers, a method and an apparatus which allow an application running on a non-preemptive multi-tasking operating system to steal CPU cycles from concurrently running applications providing for a more efficient and practical real time response of data between computers are desired.

BRIEF SUMMARY OF THE INVENTION

A method and apparatus for CPU cycle stealing on a non-preemptive multi-tasking operating system allowing a first application to preempt other applications which are running concurrently on the operating system. The steps taken to perform the CPU cycle stealing include: inserting a hook near a starting address of message monitoring calls, and vectoring the execution path to the first application whenever one of the other applications calls the message monitoring calls, allowing the first application to steal CPU cycles from one of the other applications. The vectoring is provided by the hook inserted near the starting address of the message monitoring calls.

The present invention allows for an application to run more efficiently and faster than on existing non-preemptive multi-tasking operating systems, by inserting a hook in message monitoring calls and allowing an application to steal CPU time from other concurrently running applications. Because the CPU cycle stealing feature is completely software based, and is non hardware dependent, an application using the feature may run much faster, and does not have any program restrictions that come with running code in a hardware interrupt context.

DETAILED DESCRIPTION OF THE INVENTION

Apparatus and methods for CPU cycle stealing on a non-preemptive multi-tasking operating system are disclosed.

Figure 1:
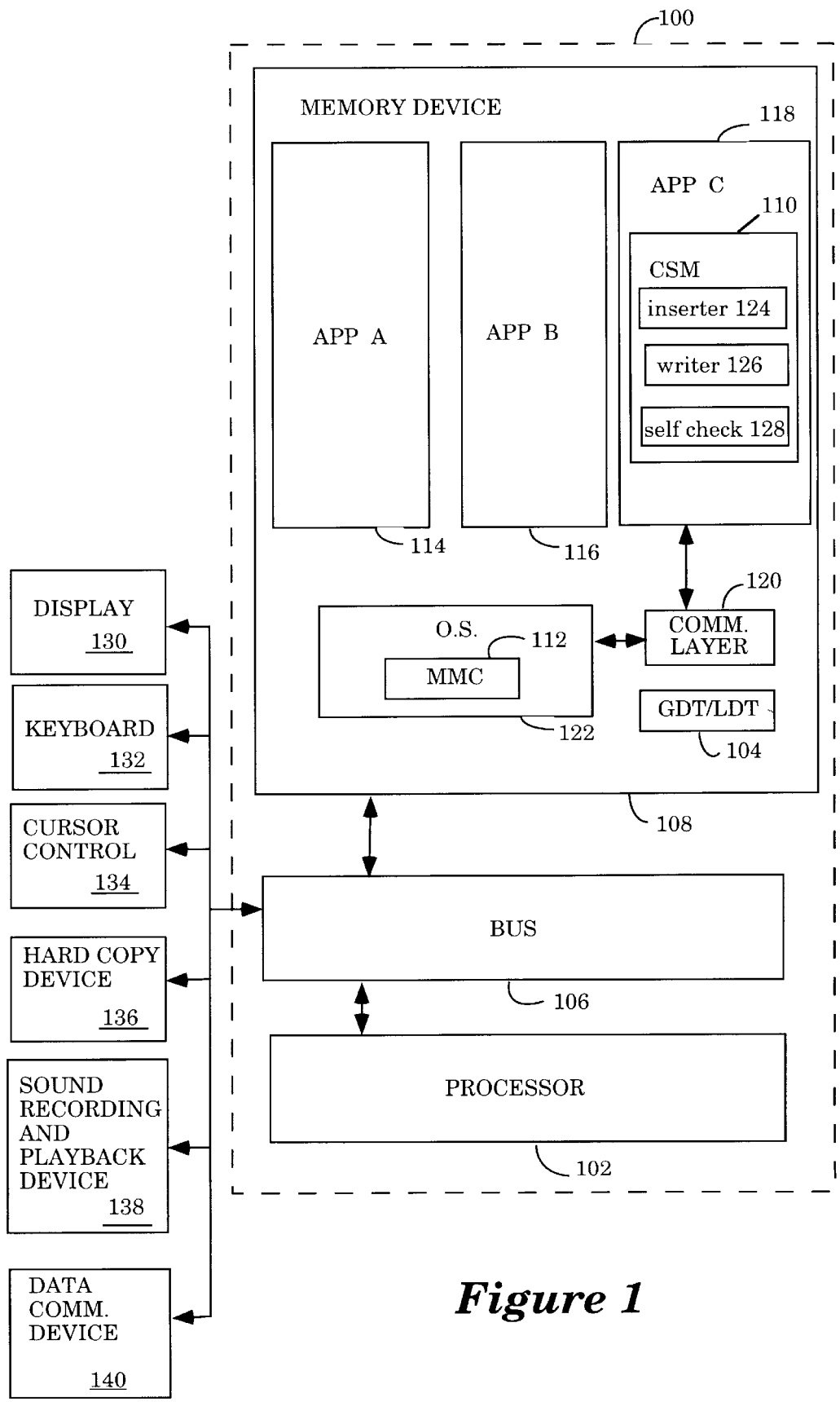
FIG. 1 illustrates a block diagram of a computer system with the CPU cycle stealing feature of the present invention.

FIG. 1 is a block diagram of a computer system with the cycle stealing feature of the present invention. Computer 100 has processor 102. Processor 102 is coupled to bus 106. Memory device 108 is also coupled to bus 106 and comprises application A 114, application B 116 and application C 118 with cycle stealing module (CSM) 110. Application C 118 is coupled to communication layer 120 which is in turn coupled to operating system 122 with message monitoring calls (MMC's) 112, and global/local descriptor table 104 which indicates all the segment base addresses of the MMC's in system memory and information regarding the contents of the segment addresses. MMC's are any calls that an application needs to make to the operating system to get user input such as keyboard strokes and mouse movements, to receive operating system generated events such as timer "ticks" and to receive messages transmitted by other processes (programs) running concurrently (also referred to as interprocess communication).

Applications A 114, B 116, and C 118 are exemplary applications running concurrently under operating system 122. Operating system 122 is a multi-tasking operating system such as Microsoft Windows®. CSM 110 has an inserter portion 124 which inserts an entry representing segment base addresses of MMC's in system memory and information regarding contents of the segment addresses into the local/global descriptor table in system memory. Writer portion 126 writes a "hook" at the beginning of MMC's in system memory. Self check portion 128 checks to see whether or not the application calling an MMC is the application containing the CSM itself. If the application is the one making the MMC call, then normal operation is resumed without any CPU cycle stealing being performed.

Computer 100 may be coupled to different peripheral devices including display device 130, keyboard 132, cursor control 134 such as a mouse, hard copy device 136 such as a printer, sound recording and playback device 138, and data communication device 140 such as a modem.

Figure 2:
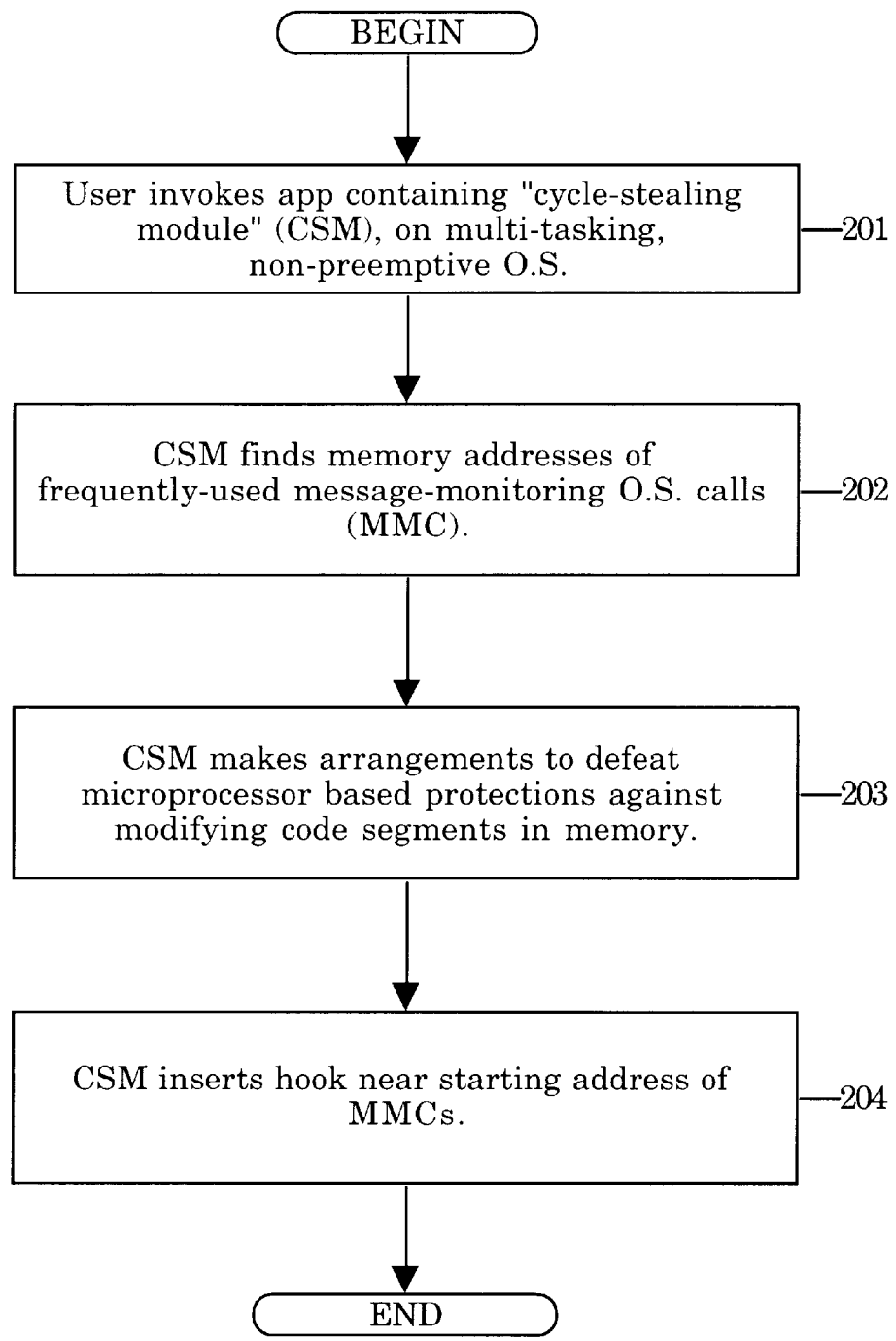
FIG. 2 is a flow diagram illustrating the set up phase of the CPU cycle stealing feature of the present invention.

FIG. 2 is a flow diagram illustrating the set up phase of the CPU cycle stealing feature of the present invention. In step 201, a user of a computer system with the CPU cycle stealing feature of the present invention invokes an application (program) containing a CSM on a multi-tasking non-preemptive operating system (e.g. MS Windows®). In step 202, the CSM finds memory addresses of frequently used message monitoring operating system calls (MMC). For example, in Microsoft Windows®, CSM may find addresses of PeekMessage and GetMessage calls, using GetProcAddress for this purpose. In Windows® PeekMessage and GetMessage calls are often called when a user communicates with an operating system through mouse clicks and keyboard strokes, as is well known in the art.

In step 203, CSM makes arrangements to defeat operating system (OS) or hardware (microprocessor) based protections against modifying segments in memory which segments are initially created by the operating system. When the operating system starts up, it divides available space in memory into segments and defines the segments, as for example, as code or data, in a global/local descriptor table also in memory. The CSM creates a data segment entry in the processor's (for example Intel 386 or a later processor version) local descriptor table (LDT) or global descriptor table (GDT). The created data segment entry overlays the code segment containing starting addresses of PeekMessage ( ) and GetMessage ( ). The method by which a data segment is created in a local/global descriptor table would be readily understood by those skilled in the art.

In step 204, CSM inserts a "hook" near the starting addresses of MMC's. A "hook" is a CALL or JUMP instruction which vectors the execution path from the code of the operating system to the code of the CSM. The CSM then steals CPU cycles from applications which made the MMC calls, allowing an application with a CSM feature to use the stolen CPU cycles, and returning control of the CPU to the instruction following the "hook". More detailed steps followed in the actual process taken by the CSM are described along with the description of FIG. 4. With the set up phase complete, the CSM is ready to steal CPU cycles any time an application makes an MMC. The method by which a "hook" is actually inserted at the starting address of a call would be readily apparent to one skilled in the art.

Figure 3:
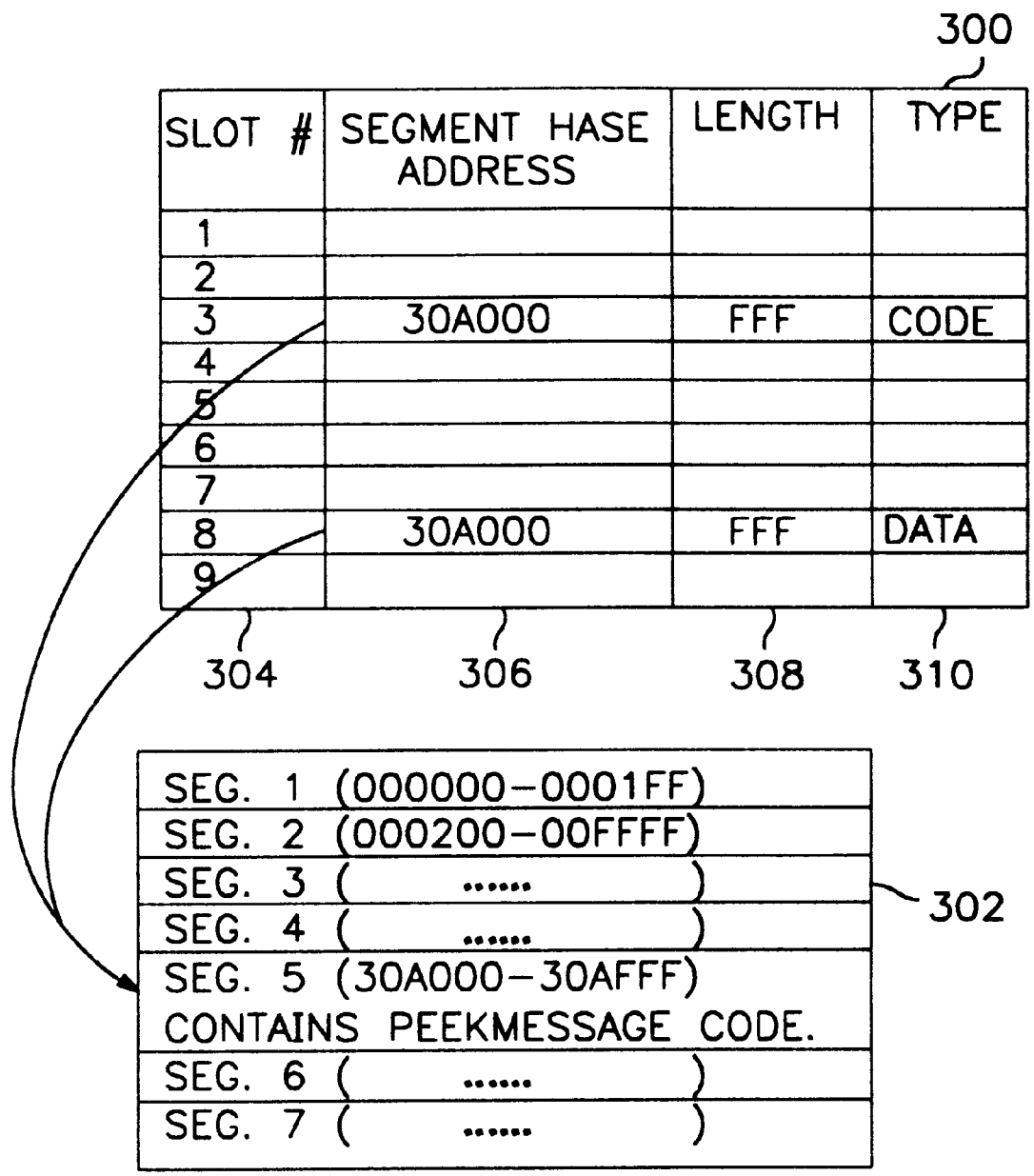
FIG. 3 illustrates the CPU cycle stealing feature of the present invention through exemplary illustrations of a global/local descriptor table and its interaction with an exemplary system memory map.

FIG. 3 illustrates the CPU cycle stealing feature of the present invention through exemplary illustrations of a global/local descriptor table and its interaction with an exemplary system memory map. Simplified global/local descriptor table 300 has segment base addresses 306 mapped to addresses in system memory 302. Slot 304 of global/local descriptor table 300 indicates the entry number of global/local descriptor table 300. Segment base address 306 indicates the starting address in the system memory for the entry in the global/local descriptor table 300. Length 308 indicates the length of the system memory segment starting at the address indicated in the segment based address 306. Finally, type 310 indicates the type of entry of the segment starting at the segment base address.

In the illustrated exemplary global/local descriptor table 300, slot 3 and slot 8 both have entries with segment base address equal to 30A000. The numbers in the tables are in hexadecimal notation. Slot 3's entry for segment base address 30A000 is for a segment containing code and is inserted by the operating system. Slot No. 8's entry for segment base address 30A000 is for a data segment inserted into global/local descriptor table 300 by the CSM of the present invention. The same segment base address is allowed for two different types of segments, namely code and data. The point to note is that a write operation to the address 3:XXXX causes a protection fault because the descriptor table denotes the segment as a code segment. On the other hand, a write operation to the address 8:XXXX is allowed, even though it is the same physical memory location as 3:XXXX, because global/local descriptor table 300 denotes the segment as a "data" segment.

The actual physical memory locations 30A000 to 30AFFF contain the code of an MMC call such as PeekMessage, as exemplified in system memory 302 segment 5. By writing to the segment at address 8:XXXX, a call or jump instruction can be inserted which changes the execution path from the code of the operating system call to the code of the CSM. The change in execution path occurs every time an application calls an MMC, allowing the CSM to steal CPU cycles from the calling application. Thus any application containing a CSM may utilize the stolen CPU cycle time to perform its functions and when the functions are completed, the CSM returns control to the instruction following the call or jump instruction. The simplified exemplary global/local descriptor table is a feature of the Intel 80386® and compatible microprocessors.

Figure 4:
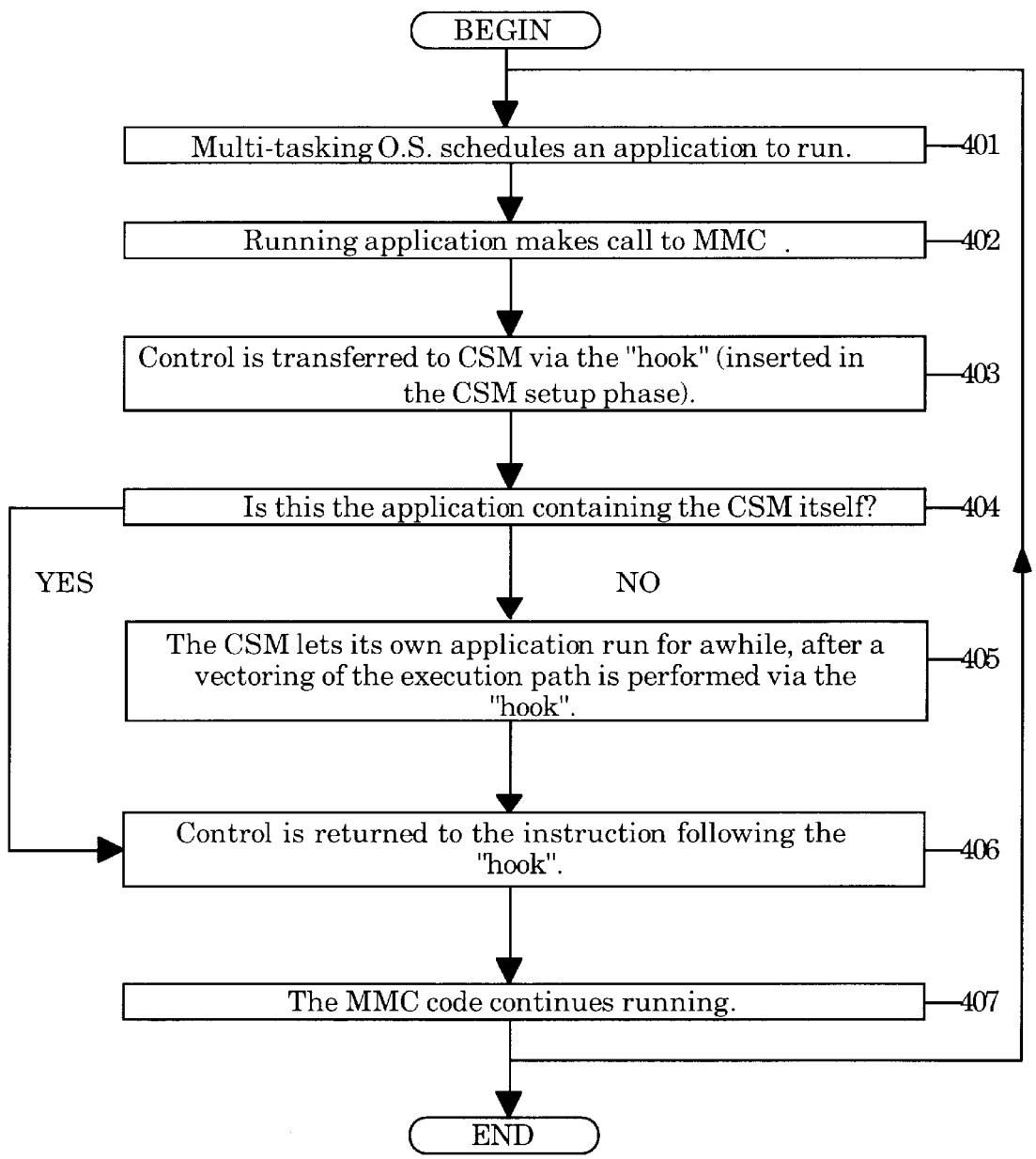
FIG. 4 is a flow diagram illustrating the steps performed during an exemplary CPU cycle stealing after an initial set up phase as illustrated in FIG. 2.

FIG. 4 is a flow diagram illustrating the steps followed by the cycle stealing feature of the present invention after the set up phase which was illustrated in FIG. 2. In step 401, a multi-tasking operating system such as Microsoft Windows® schedules an application to run. In step 402, the application that's running makes a call to an MMC (Message Monitoring Call). In Microsoft Windows®, the two most frequently used MMC's made by an application to receive external messages are GetMessage and PeekMessage.

In step 403, the execution path is transferred to the CSM via a "hook" as inserted in the CSM set up phase illustrated in FIG. 2. More specifically, the "hook" (i.e. CALL or JUMP instruction) is inserted at the beginning of a MMC such as a PeekMessage in Microsoft Windows®, enabling a vectoring of the execution path from the MMC call to the CSM in an application. In step 404, the calling application is checked to see if it is the application containing the CSM itself. Since CSM is an application running on the multi-tasking operating system, it will call MMC's. If the application calling the MMC is the CSM itself, CPU cycle stealing is not performed, and in step 406, control is returned to the instruction following the "hook" so that the CSM may resume it's execution.

Otherwise, in step 405, the CSM allows its own application to run. Thus, the CSM steals CPU cycles from the application calling the MMC's for its own application. In step 406, control is returned to the instruction following the "hook" and normal execution resumes for the application calling the MMC. In step 407, the MMC code continues to run. Both the operating system and the calling application are unaware that the CSM has "stolen" CPU time.

Figure 5:
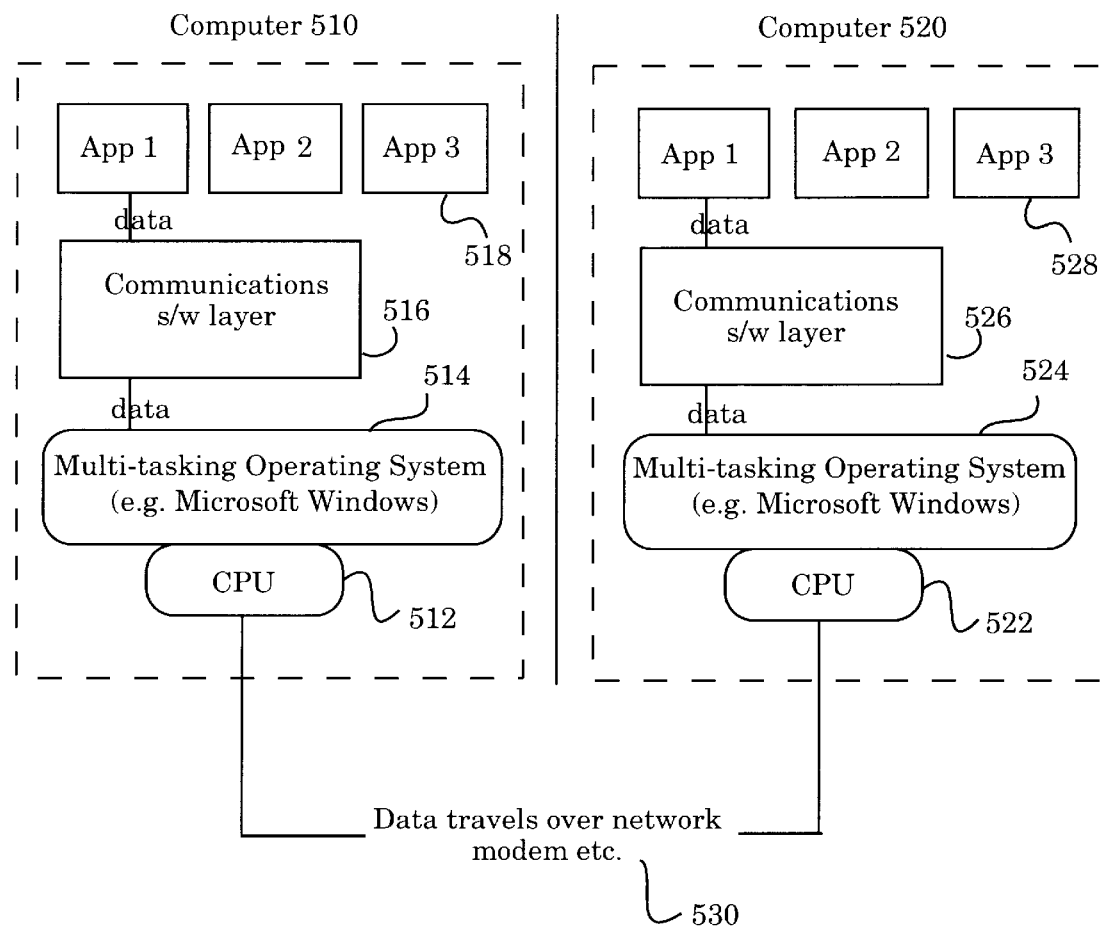
FIG. 5 illustrates an exemplary implementation of the present invention.

FIG. 5 illustrates an embodiment of an implementation of the present invention. Data is transmitted over a network 530 between computer 510 and computer 520. Computer 510 has CPU 512 with an operating system 514. The operating system schedules multiple applications to run through communications layer 516. Multiple applications 518 share CPU cycles in a round robin type scheme. Computer 520 has the same configuration. Computer 520 has CPU 522, operating system 524, communications layer 526 and multiple applications 528. With the feature of the present invention, both computer 510 and computer 520 may have a cycle stealing module (CSM) which allows the application containing the CSM to steal CPU cycles from other applications running concurrently. Thus, the CSM feature allows for real time data to travel over the network using modems connected to each computer in a more real time manner.

Figure 6:
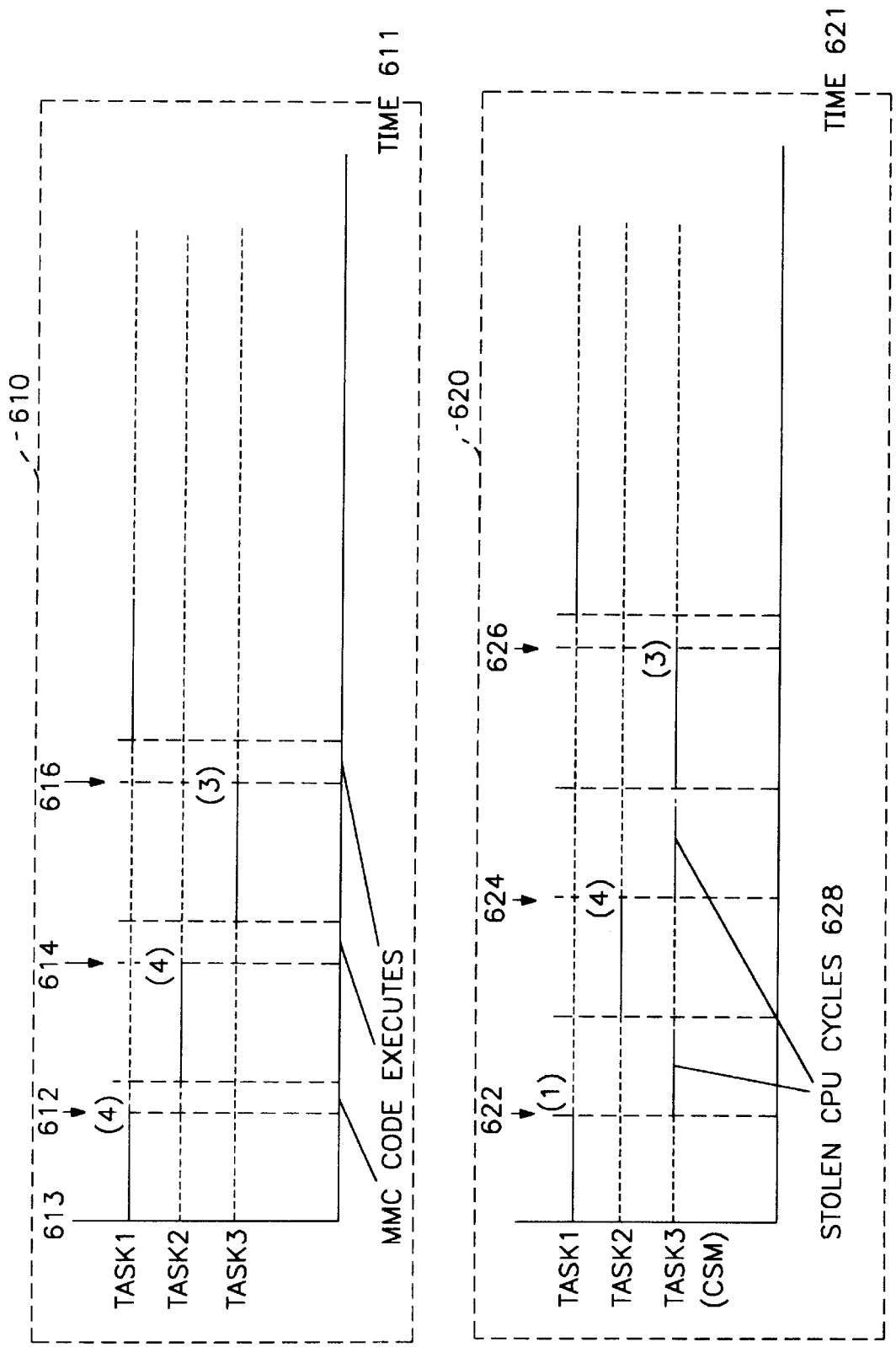
FIG. 6 is a timing diagram illustrating the differences between the CPU timing distribution between prior art methods and the present invention.

FIG. 6 illustrates two timing diagrams, one illustrating three tasks executed without the cycle stealing feature of the present invention and another timing diagram illustrating this very same three tasks executing with the cycle stealing feature of the present invention. In timing diagram 610 with horizontal time axis 611 and vertical task axis 613, points 612, 614, and 616 are times when the respective tasks calls an MMC. First, task one executes and calls an MMC at point 612, then task two starts executing and calls an MMC at point 614. Task three then starts executing and calls an MMC at point 616. Finally, task one starts executing again. This is an example of concurrently executing tasks using a prior art round robin type scheme without the cycle stealing feature of the present invention.

Timing diagram 620 has horizontal time axis 621 and vertical task axis 623. In the diagram, task one is executing and calls MMC at point 622. At this point, task three which contains the CSM feature of the present invention steals CPU cycles away from task one. Then task two starts executing and calls an MMC at point 624. Task three then steals CPU cycles again at point 626 as illustrated by CPU cycles 628. With the cycle stealing feature of the present invention, task three is able to execute faster than it was able to do under the prior art method.

What has been described is a method and apparatus for CPU cycle stealing by an application running concurrently with other applications on a multi-tasking operating system through insertions of a "hook" at the beginning of MMC calls.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A process for providing preemptive scheduling of an application program in a non-preemptive multi-tasking operating system, said process comprising:

finding a message monitoring call;

inserting a hook to a cycle stealing module in the message monitoring call;

vectoring execution to the cycle stealing module when the message monitoring call is executed; and vectoring execution to the application program from the cycle stealing module.

2. The process of claim 1 wherein said vectoring execution to the application program further comprises:

vectoring execution to the application program if the application program did not cause execution of the message monitoring call; and returning control to an instruction following the hook.

3. The process of claim 2 further comprising:

scheduling a calling application to run, said scheduling performed by the non-preemptive multi-tasking operating system; and calling the message monitoring call whereby the message monitoring call is executed, said calling performed by the calling application.

4. The process of claim 1 wherein said inserting further comprises defeating protections against modifying a memory-resident code segment.

5. The process of claim 4 wherein said defeating protections further comprises:

finding a first entry in a descriptor table with an address range for a code segment that includes an address where the hook will be inserted;

creating a second entry in the descriptor table with the address range for the code segment;

designating the second entry as a data segment.

6. The process of claim 1 wherein said finding further comprises finding a plurality of message monitoring calls, said inserting further comprises inserting a hook to the cycle stealing module in each of the plurality of message monitoring calls, and said vectoring execution to the cycle stealing module further comprises vectoring execution to the cycle stealing module whenever one of the plurality of message monitoring calls is executed.

7. A computer application program embodied in data signals, said computer application program including a process for preemptively scheduling said computer application program in a non-preemptive multi-tasking operating system, said computer application program comprising:

a first segment for causing execution of the computer application program;

a second segment for finding a message monitoring call; and a third segment for inserting a hook in the message monitoring call, said hook vectoring execution to the first segment when the message monitoring call is executed.

8. The computer application program of claim 7 wherein said first segment further comprises:
- a fourth segment for executing the computer application program if the computer application program did not cause execution of the message monitoring call; and
- a fifth segment for returning control to an instruction following the hook.

9. The computer application program of claim 8 wherein a calling application is scheduled to run by the non-preemptive multi-tasking operating system, and the message monitoring call is called by the calling application.

10. The computer application program of claim 7 wherein said third segment further comprises a sixth segment for defeating protections against modifying a memory-resident code segment.

11. The computer application program of claim 10 wherein said sixth segment further comprises:
- an seventh segment for finding a first entry in a descriptor table with an address range for a code segment that includes an address where the hook will be inserted;
- an eighth segment for creating a second entry in the descriptor table with the address range for the code segment;
- an ninth segment for designating the second entry as a data segment.

12. The computer application program of claim 7 wherein said second segment is further for finding a plurality of message monitoring calls,
said third segment is further for inserting a hook in each of the plurality of message monitoring calls, each of said hooks vectoring execution to the first segment when one of the plurality of message monitoring calls is executed.

13. The computer application program of claim 7 wherein said data signals are signals embodied on computer-readable media or signals embodied in a carrier wave.

14. A computer system comprising:
- a storage means for storing computer programs;
- a processing means for executing computer programs;
- a bus means coupled to the processing means and to the storage means for transferring computer programs between the storage means and the processing means;
- a non-preemptive operating system stored on the storage means for non-preemptively scheduling computer programs for execution;
- a message monitoring call included in the non-preemptive operating system; and
- a first application program stored on the storage means, said first application program including a process for preemptively scheduling the first application program in the non-preemptive multi-tasking operating system, said first application program including
  - a cycle stealing module, said cycle stealing module vectoring execution to the first application program when execution is vectored to the cycle stealing module,
  - means for finding the message monitoring call, and
  - means for inserting a hook in the message monitoring call, said hook vectoring execution to the cycle stealing module when the message monitoring call is executed.

15. The computer system of claim 14 wherein said cycle stealing module further comprises:
- means for vectoring execution to the first application program if the first application program did not cause execution of the message monitoring call; and
- means for returning control to an instruction following the hook.

16. The computer system of claim 15, further comprising a second application program stored on the storage means, wherein said second application program is scheduled for execution by the non-preemptive multi-tasking operating system, and the message monitoring call is called by the second application program.

17. The computer system of claim 14 wherein said means for inserting a hook further comprises means for defeating protections against modifying a memory-resident code segment.

18. The computer system of claim 17 wherein said means for defeating protections further comprises:
- means for finding a first entry in a descriptor table with an address range for a code segment that includes an address where the hook will be inserted;
- means for creating a second entry in the descriptor table with the address range for the code segment;
- means for designating the second entry as a data segment.

19. The computer system of claim 14 wherein
said means for finding further comprises finding a plurality of message monitoring calls,
said means for inserting further comprises inserting a hook in each of the plurality of message monitoring calls, each of said hooks vectoring execution to the cycle stealing module when one of the plurality of message monitoring calls is executed.

20. A computer system comprising:
- a processor;
- a non-preemptive operating system executed by the processor;
- a message monitoring call included in the non-preemptive operating system; and
- a first application program that includes a process for preemptively scheduling the first application program in the non-preemptive multi-tasking operating system, said first application program including
  - a cycle stealing module, said cycle stealing module vectoring execution to the first application program when execution is vectored to the cycle stealing module,
  - an inserter portion that finds the message monitoring call, and
  - a writer portion that inserts a hook in the message monitoring call, said hook vectoring execution to the cycle stealing module when the message monitoring call is executed.

* * * * *